United States Patent [19]

Heard et al.

[11] Patent Number: 5,039,061
[45] Date of Patent: Aug. 13, 1991

[54] MAGNETICALLY ACTUATED LINEAR VALVE OPERATOR AND METHOD

[75] Inventors: Daniel B. Heard, Metairie; Alan C. Fernbaugh, Baton Rouge; Howard E. Nobles, Jr., Metairie, all of La.

[73] Assignee: John H. Carter Co., Inc., Metairie, La.

[21] Appl. No.: 472,630

[22] Filed: Jan. 26, 1990

[51] Int. Cl.$^5$ ............................................. F16K 31/08
[52] U.S. Cl. ..................................... 251/65; 137/553
[58] Field of Search ................. 137/553, 554; 251/65, 251/129.04

[56] References Cited

U.S. PATENT DOCUMENTS

| | | | |
|---|---|---|---|
| 2,533,491 | 12/1950 | McMahon et al. | 251/65 |
| 2,629,401 | 2/1953 | Miller | 251/65 X |
| 2,669,668 | 2/1954 | Okulitch et al. | 310/104 |
| 3,172,364 | 3/1965 | Barotz | 103/87 |
| 3,212,751 | 10/1965 | Hassa | 251/65 |
| 3,299,819 | 1/1967 | McCoy | 103/87 |
| 3,347,262 | 10/1967 | Gibson | 137/375 |
| 3,376,013 | 4/1968 | Mallett | 251/65 X |
| 3,476,355 | 11/1969 | Sherwood | 251/65 |
| 3,572,981 | 3/1971 | Pearson et al. | 417/420 |
| 3,625,473 | 12/1971 | Ignatjev | 251/65 |
| 3,747,892 | 7/1973 | Gigantino et al. | 251/65 |
| 3,774,878 | 11/1973 | Martinez | 251/65 |
| 3,938,914 | 2/1976 | Zimmermann | 417/420 |
| 3,941,517 | 3/1976 | Miyahara | 417/420 |
| 4,004,258 | 1/1977 | Arnold | 251/65 X |
| 4,266,914 | 5/1981 | Dickinson | 417/63 |
| 4,304,256 | 12/1981 | Taiani | 137/556.3 |
| 4,304,532 | 12/1981 | McCoy | 417/420 |
| 4,310,023 | 1/1982 | Kah, Jr. | 137/625.5 |
| 4,645,433 | 2/1987 | Hauenstein | 417/420 |
| 4,647,010 | 3/1987 | Sogabe et al. | 251/65 X |
| 4,671,486 | 6/1987 | Giannini | 251/65 |
| 4,672,992 | 6/1987 | Vanderlaan et al. | 137/331 |
| 4,694,860 | 9/1987 | Eidsmore | 251/65 X |
| 4,722,661 | 2/1988 | Mizuno | 415/131 |
| 4,747,577 | 5/1988 | Dimock | 251/158 |
| 4,770,389 | 9/1988 | Bodine et al. | 251/65 X |

Primary Examiner—John Rivell
Attorney, Agent, or Firm—Pravel, Gambrell, Hewitt, Kimball & Krieger

[57] ABSTRACT

A valve apparatus for solving a problem relating to fugitive emissions from sliding stem valves provides a valve body and a vertically extending, vertically slideable stem member that actuates a valving member between open flow and closed flow positions. The stem extends at generally right angles to the overall direction of flow through the valve body. A laterally extending valve bonnet is affixed in a sealable fashion to the valve body and forms a fluid tight seal over the valve stem. The end portion of the stem removed from the valving member carries a large magnetically moved piston which closely approximates the internal diameter of the bonnet. An external, preferable annular magnetic member slides between open flow and closed flow positions on the outside of the bonnet, its magnetic field sliding with the internal piston in order to open and close the valve. A valve position indicator or transmitter either indicates or transmits the position of the valving member at all times.

14 Claims, 8 Drawing Sheets

MAGNETICALLY ACTUATED LINEAR VALVE OPERATOR AND METHOD

BACKGROUND OF THE INVENTION

1. Field of the Invention

The present invention relates to valves used for the handling of hazardous materials, chemicals, and chemical process fluids and the like, wherein a magnetically operated external sliding valve actuator moves a valve stem within a closed walled, sealed bonnet and along a linear path between open flow and closed flow positions.

2. General Background

There are numerous chemical plants, paper manufacturing facilities, and other factories used in the manufacturing of chemicals wherein sliding stem type valves (such as plug, globe, and the like) are used. These commercially available valves include a valve plug member operated by a stem which extends into and through a valve bonnet at a dynamic seal called a packing gland. Any type of leakage through this packing gland is at best only costly and at its worst can create an environmental hazard. These emissions, often called "fugitive emissions" can amount to a substantial environmental problem when numerous valves are leaking at a given facility. Such emissions can also trigger chemical reactions such as the formation of acids, that corrode the valve itself.

A sliding stem-type valve creates a special leakage problem as opposed, for example, to a rotary valve because the stem moves in a fashion which sequentially places the stem externally and internally of the housing during its normal operation. The chemical being conveyed can be moved from the inside of the valve to the exterior thereof, or trash can be carried from outside to the inside via the sliding stem. As an example, if the valve is conveying chlorine, molecules of the chlorine can move externally of the valve housing on the stem and contact free hydrogen in the surrounding air, forming hydrogen chloride. This acid can badly corrode the stem, and accelerate the escape of fugitive emissions.

As a solution to this problem, the present invention provides a method and apparatus that eliminates the dynamic seal of the sliding stem and the packing gland which forms a portion of tens of thousands of valves presently in service in the prior art. The present invention provides a seal which is static rather than dynamic and which can be manufactured as a new O.E.M. valve assembly, or in the form of a "kit" for retrofitting valves in existing service which are plagued with leakage at the stem and packing gland.

Various magnetically driven pump arrangements have been patented. For example, the Okulitch U.S. Pat. No. 2,669,668, entitled "Magnetically Driven Centrifugal Pump" pertains to a pump construction having a magnetic coupling with magnetic attraction between rotors on opposites sides of a dividing wall.

Other patents that relate to the concept of magnetic drives for pumps include, for example, the Barotz U.S. Pat. No. 3,172,364, entitled "Pump"; the McCoy U.S. Pat. No. 3,299,819, entitled "Magnetic Drive"; the Pearson et al. U.S. Pat. No. 3,572,981, entitled "Hermetically Sealed Pump"; the Zimmermann U.S. Pat. No. 3,938,914, entitled "Pump Impeller And Coupling Magnet Structures"; the Miyahara U.S. Pat. No. 3,941,517, entitled "Magnetic Hydraulic Pump"; the Dickinson U.S. Pat. No. 4,266,914, entitled "Magnetic Drive Laboratory Pump"; the McCoy U.S. Pat. No. 3,304,532, entitled "Pump Having Magnetic Drive"; the Hauenstein U.S. Pat. No. 4,645,433, entitled "Sealing Shroud Centrifugal Pump"; and the Mizuno U.S. Pat. No. 4,722,661, entitled "Magnetic-Drive Centrifugal Pump".

Various valve constructions have been patented which use magnetic members in operation of the valve. The Gibson U.S. Pat. No. 3,347,262, entitled "Magnet Actuated Sealed Valve", provides a rotary valve magnetic coupling comprising concentric, annular sleeves which are permanent magnet couplings. The Sherwood U.S. Pat. No. 3,476,355, entitled "Magnetic Valve", uses a valve construction for controlling the flow of air, water, or light fluids, wherein a valve housing is made of insulating material having inlet and outlet portions, and a single moving part in the housing, comprises a freely movable valve closing and an opening disc of magnetic material normally supported by the housing over the valve outlet.

The Ignatjev U.S. Pat. No. 3,625,473, entitled "Permanent Magnet Valve With Magnetic Operator", discloses a valve that includes a valving member which is movable between open and closed positions and which is actuated between those positions by respective interaction and non-interaction of two magnetic fields having axes which are disposed at an angle with respect to one another.

A rotary valve construction is seen in the Gigantino U.S. Pat. No. 3,747,892, entitled "Magnetic Valve", wherein a valve structure having a driving sleeve magnetic is operated by a motor and a driven magnetic coaxial with the driving magnet connected to the valve.

Another rotary valve member is the subject of U.S. Pat. No. 4,304,256, issued to Taiani, entitled "Torque Transmitting Assembly For Rotary Valve Member". The Kah, Jr. U.S. Pat. No. 4,310,023, entitled "Magnetically Actuated Pilot Valve", includes a valve structure for fluid control systems which can direct a fluid pressure for operating a device or it can connect the device to drain. The Vanderlaan U.S. Pat. No. 4,672,992, entitled "Direct Drive Valve-Ball Drive Mechanism", provides a ball-like member which is moved by a rotary force motor using a valve coupling.

A gate valve with a magnetic closure is the subject of U.S. Pat. No. 4,747,577, issued to Dimock, entitled "Gate Valve With Magnetic Closure For Use With Vacuum Equipment". In the Dimock patent, a gate valve is provided for use with evacuable equipment and includes a housing having a pair of aligned ports in opposed walls. A valve seat surrounds one of the ports. A gate gate member is reciprocally translatable by means of a linear actuator in a direction generally normal to the central axis of the valve seat. Magnetic structures are operably associated with the gate and valve for pulling the gate and seat into sealing engagement for closure of the gate valve by exerting a closure force generally parallel to the axis of the valve seat. The linear actuator including a hollow cylinder having a piston movable therein and axially thereof which is magnetically coupled through the walls of the cylinder to an actuator member mechanically coupled to the gate for effecting reciprocal motion thereof.

SUMMARY OF THE PRESENT INVENTION

The present invention provides an improved valve apparatus for use in the control of fugitive emissions in sliding stem valves that move between open flow and closed flow positions in order to precisely control flow and valve the flow of a hazardous fluid product in a petrochemical plant, chemical process plant, or the like.

The apparatus includes a valve body having a longitudinally extending flow bore, with a valve seat being positioned within the flow bore defining an opening that communicates with the flow bore. A valving member is moveable between open and closed flow positions for sealing the opening by registering upon the valve seat in the closed position. A sliding valve stem extends laterally from the housing at generally right angles to the longitudinally extending flow bore and housing, for moving the valving member along a linear path between open and closed positions. A bonnet, connectable to the valve body forms a sealed envelope over the entire valve stem. This bonnet is a closed wall structure not having a packing gland, so that there is not a sliding relationship between the bonnet at the packing gland and the valve stem through which fugitive emissions can escape.

A magnetic member is positioned externally of the bonnet for forming a magnetic field inside the bonnet, the magnetic member being slideably supported for movement along the line generally parallel to the valve stem. In the upper end portion of the stem carries an enlarged member that moves with the magnetic field when the magnetic member slides between open and closed positions.

In the preferred embodiment, the magnetic member includes portions externally of the bonnet and positioned at least on opposite sides of the stem, and preferably an annular sleeve which extends entirely around the bonnet.

In the preferred embodiment, the upper end portion of the stem carries a member having a cross section that approximates the cross section of the bonnet interior, and is preferably a large magnetic member.

In the preferred embodiment, the valve body has left and right inlet and outlet portions with the valve seat being positioned generally therebetween and the bonnet affixes to a bolt circle portion of the valve body adjacent the valve seat generally between the inlet and the outlet.

The present invention also provides an improved method for modifying in situ sliding stem valves having a valve body with a valving member carried by a sliding stem that extends through a packing gland of the sliding stem valve bonnet in order to prevent fugitive emissions at the packing gland. As part of the method, the existing valve bonnet is removed. The valve stem is then closed with a laterally extending closed wall bonnet structure that entirely seals the valve stem and adjacent fluids so that fluids are contained within the valve body and the bonnet. An external operator positioned adjacent the bonnet moves the stem with a magnetic field that is preferably formed by the external operator, (which can be a permanent magnet in the shape of a sleeve) and an internal magnet attached to the valve stem movement of the operator then moves the stem, as the magnets remain adjacent one another. However, the magnetic field could be a single magnetic member, either the magnetic sleeve externally surrounding the bonnet, or a cylindrical permanent magnet carried inside the bonnet on the valve member.

BRIEF DESCRIPTION OF THE DRAWINGS

For a further understanding of the nature, objects, and advantages of the present invention, reference should be had to the following detailed description, taken in conjunction with the accompanying drawings, in which like reference numerals denote like elements, and wherein.

DETAILED DESCRIPTION OF THE PREFERRED EMBODIMENT

Figure 1:
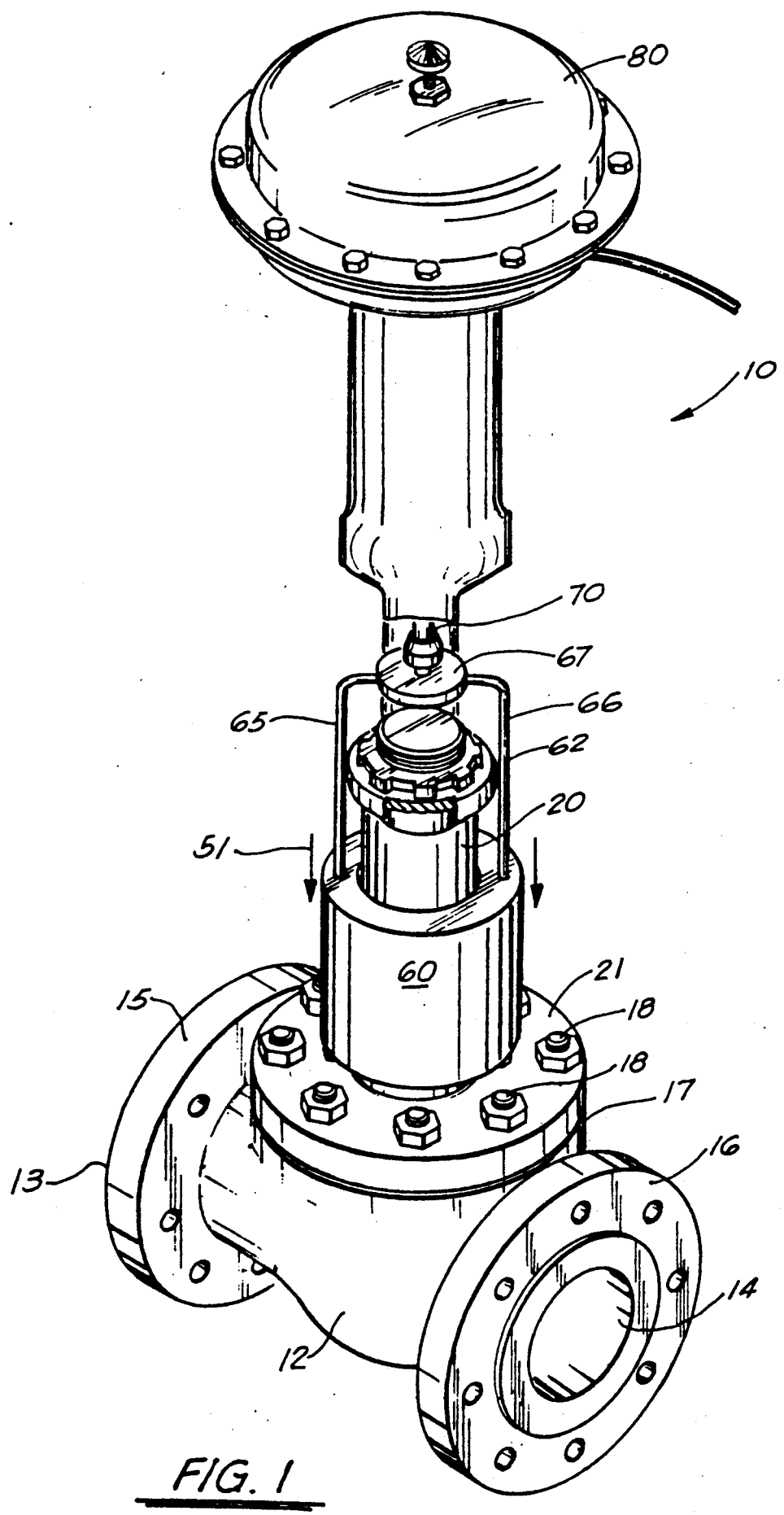
FIG. 1 is a perspective view of the preferred embodiment of the apparatus of the present invention.

FIG. 1 shows in perspective view, the preferred embodiment of the apparatus of the present invention designated generally by the numeral 10. Valve apparatus 10 includes a valve body 12 having an inlet 13 and an outlet 14 each of which can be provided with flanged connections 15, 16 respectively for bolting the valve body 12 into a flow line.

Figure 3:
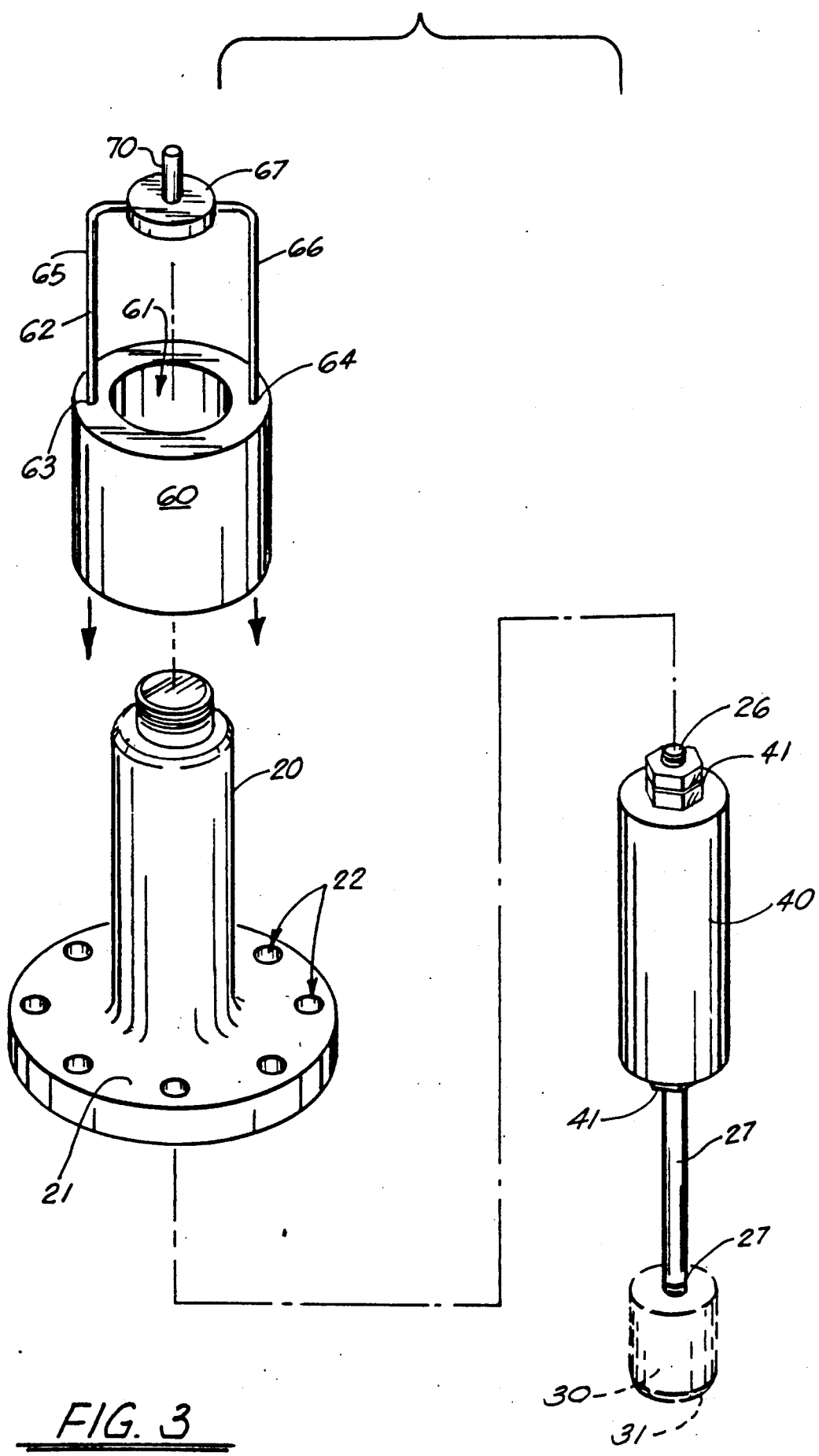
FIG. 3 is a partial exploded perspective view of the preferred embodiment of the apparatus of the present invention.
Figure 4:
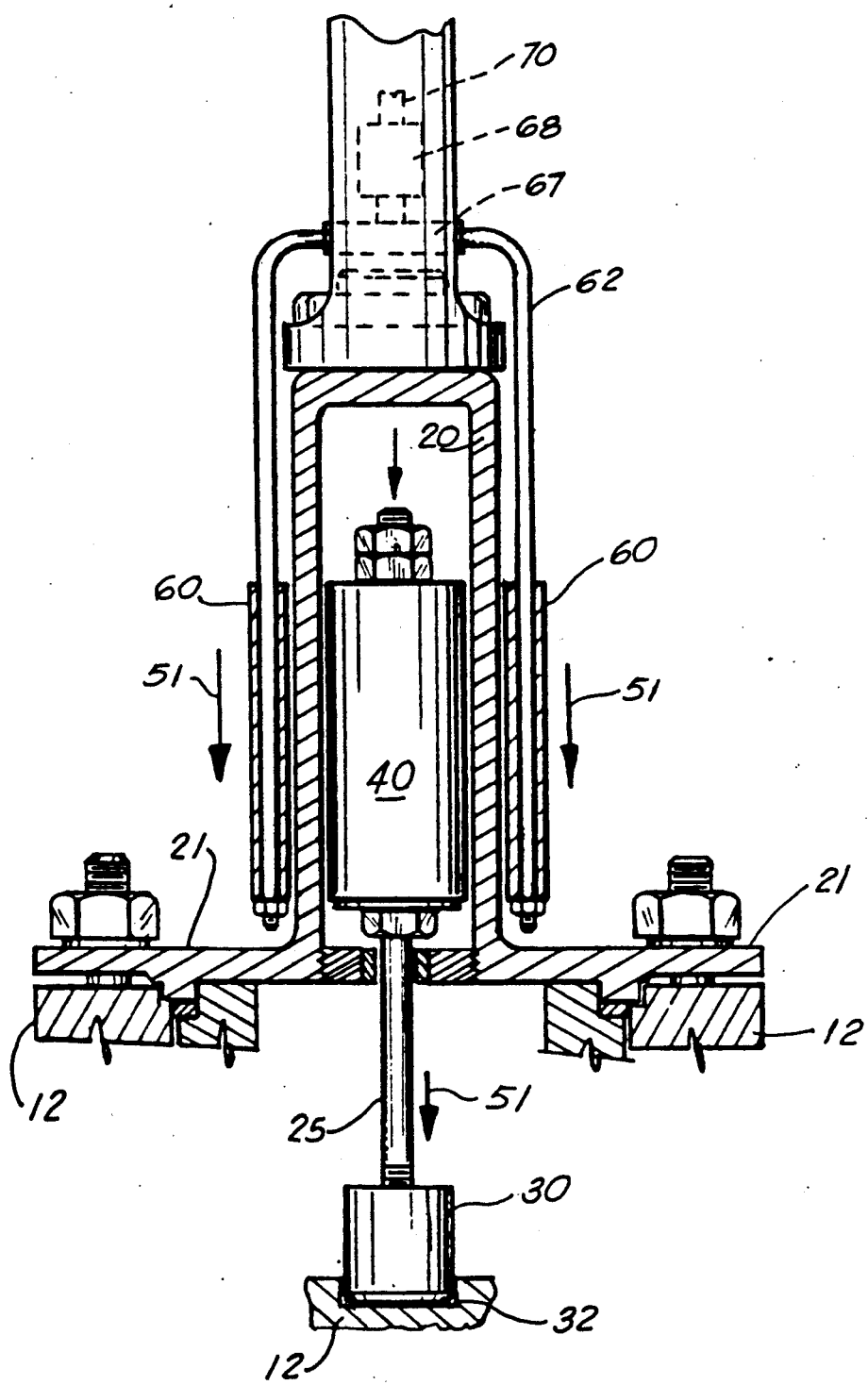
FIG. 4 is a partial, sectional elevational view of the preferred embodiment of the apparatus of the present invention illustrating a closed flow position.

The central portion of the valve body 12 includes an upper, generally flat surface 17 receptive of valve bonnet 20 (FIG. 3) which provides a corresponding mating flange 21 having a plurality of openings 22 for bolting the flange 21 and the bonnet 20 to the valve body 12 at surface 17 using the plurality of bolted connections 18 arranged in a circle, as shown in FIG. 1.

An internal valve stem 25 preferably in the form of an elongated metalic rod having threaded portions 26, 27 at its ends moves the valving member 30. The lowermost end portions of the stem 25 carries a valve plug 30 which is preferably cylindrical in shape having a valving end portion 31 which registers upon valve seat 32 (see FIG. 5). Generally opposite valving member 30, an internal magnetic member 40 is provided, which is preferably cylindrical, having an internal bore (not shown) which allows the magnet 40 to be assembled upon stem 25 and held in position with a plurality of bolts 41. Magnetic member 40 can be a permanent magnet.

The bonnet 20 provides a closed wall sealed structure. The flange 21 portion of the bonnet forms a fluid tight seal with valve body 12 which can be made fluid tight by torquing the plurality of bolts 18 which form a circular arrangement, as shown in FIG. 1. However, the closed wall structure of the bonnet 20 extends completely around the entire stem 25 which is an improvement over prior art designs wherein the stem extends through a packing gland located in the top of the bonnet.

Figure 5:
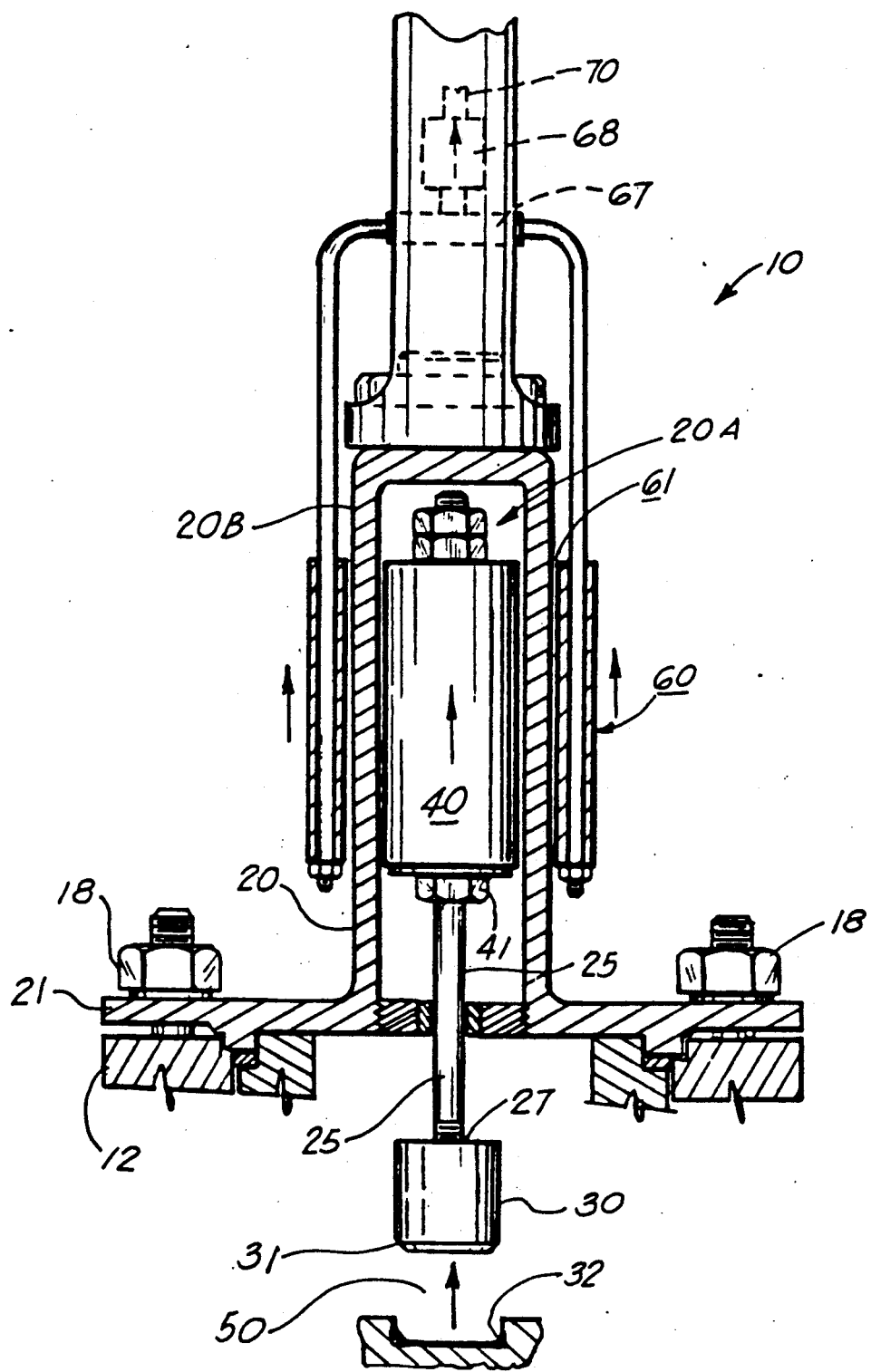
FIG. 5 is a partial sectional elevational view of the preferred embodiment of the apparatus of the present invention illustrating the valve in an open flow position.

In FIG. 5, the valve 10 apparatus is shown in a fully up position wherein the valving member 30 has in this case lifted off seat 32, as shown by the arrow 50. Thus, the stem 25 has been lifted to its uppermost position within the interior 20A of bonnet 20. It should be understood that the embodiments shown illustrate a push-down-to-close valve. However, the present invention will work as well with push-down-to-open valves.

The member 40 has a cylindrical cross section which closely approximates but is slightly smaller than the internal cross sectional area of the interior 20A of bonnet 20, as shown in FIG. 5. The member 30 is lifted upwardly by means of an annular, external permanent magnet sleeve 60 (FIGS. 3 and 5) which extends about the bonnet 20, having an internal wall 61 which is of corresponding size to the external wall 20B of bonnet 20.

Figure 2:
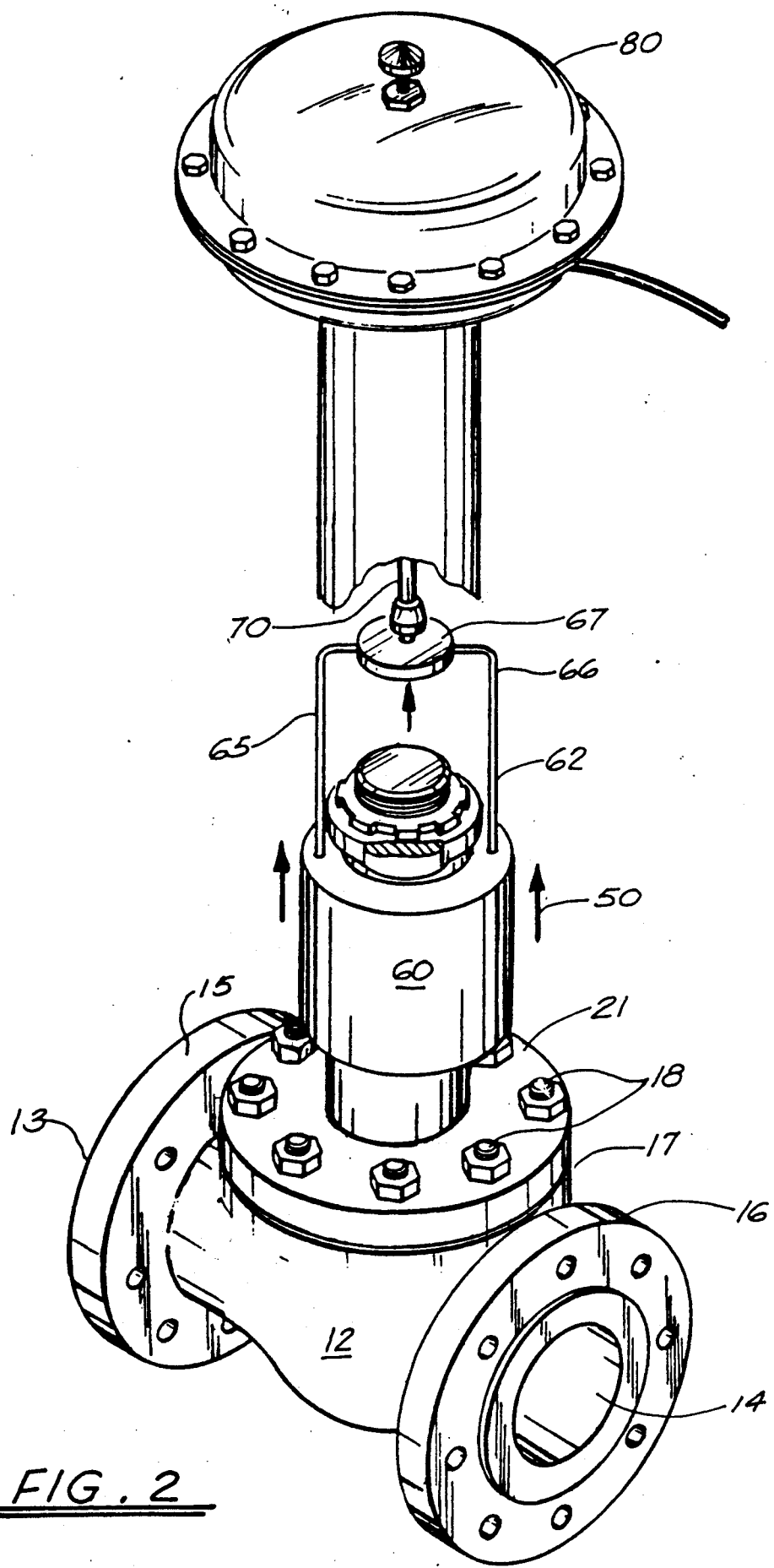
FIG. 2 is a perspective, partially cutaway view of the preferred embodiment of the apparatus of the present invention.

Yoke 62 affixes to sleeve 60 at a pair of openings 63, 64. Yoke 62 includes a pair of spaced-apart rods 65, 66 which are attached to a disc 67 that is moved upwardly and downwardly by means of connector rod 70. The connector rod 70 extends upwardly and attaches to diaphragm operator 80 which can be a conventional diaphragm type operator which is driving with fluid pressure in order to raise and lower rod 70. Thus, in FIG. 1, the overall view of the valve illustrates the valve in a down position wherein the magnetic sleeve 60 has moved downwardly, as shown by the arrows 51, to a downward and in this case closed flow position. In FIG. 2, the arrows 50 indicate upward movement of the sleeve 60.

The uses of these valves are generally, but not limited to, for the purpose of either process shutdown or process control. While it is necessary and appropriate that the position of the valve (opened, closed, or somewhere in-between) be known, it is generally accepted that the position of the valve plug in process control or throttling service is most important.

In many cases this style of valve is used in the control of certain processes in which it is necessary to know the position of the valve plug. The position may be either visually indicated or transmitted to a controlling device by a variety of means such as a pneumatic or electronic signal.

It is of note that the closer one can come to knowing the actual position of the valve plug itself, as opposed to the position implied by some other member of the valve apparatus, such as the actuator stem, the greater the accuracy of control and the confidence of the operator.

In order that the device disclosed be of greater utility to and meet the requirements of industry, the use of an external stem position indicator is disclosed. Given that the valve plug, valve plug stem, and the internal magnetic coupling device form an assembly, the position of one will generally indicate the position of the others. Thus, the use of a valve stem position indicator/transmitter operating by means of reacting to the change in position of the internal magnetic coupling will be used.

It is necessary to confirm that the valve stem has in fact moved exactly as the actuator stem has moved in order to eliminate hysteresis in process control and to indicate when certain valves may become "stuck" due to internal failure or clogging.

Figure 6:
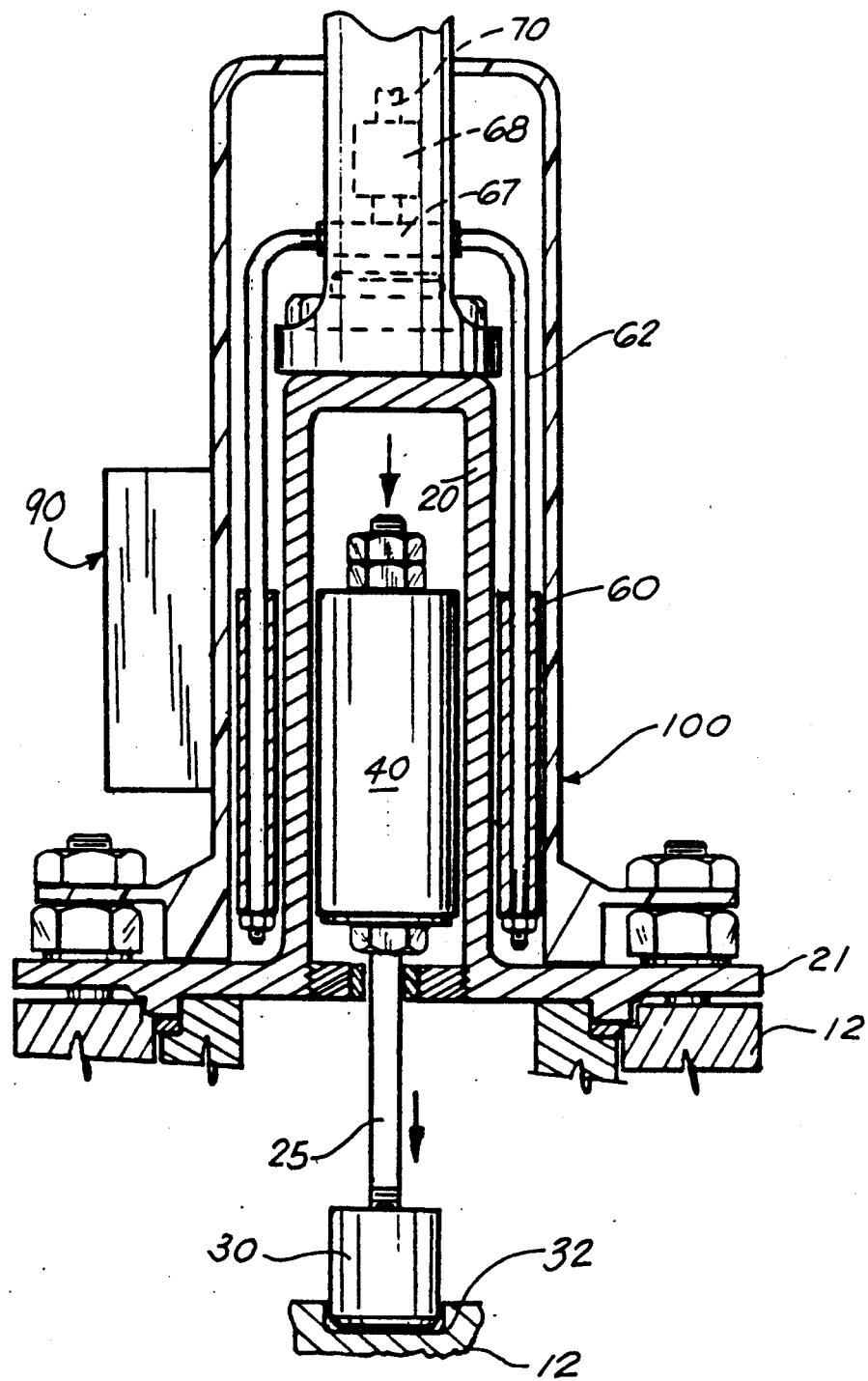
FIG. 6 is a sectional elevational view of the preferred embodiment of the apparatus of the present invention in a closed flow position.
Figure 7:
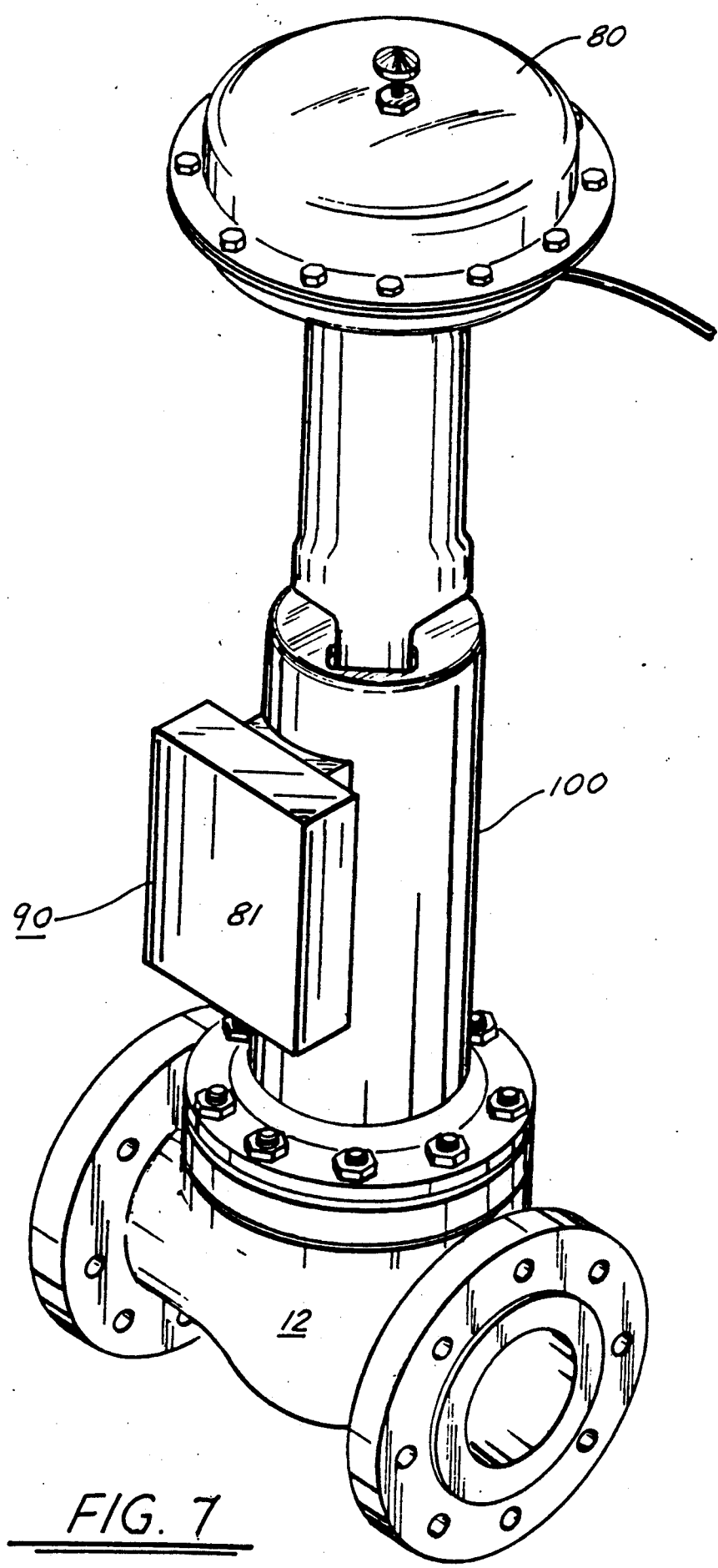
FIG. 7 is a perspective view of the preferred embodiment of the apparatus of the present invention showing the valve stem position transmitter.
Figure 8:
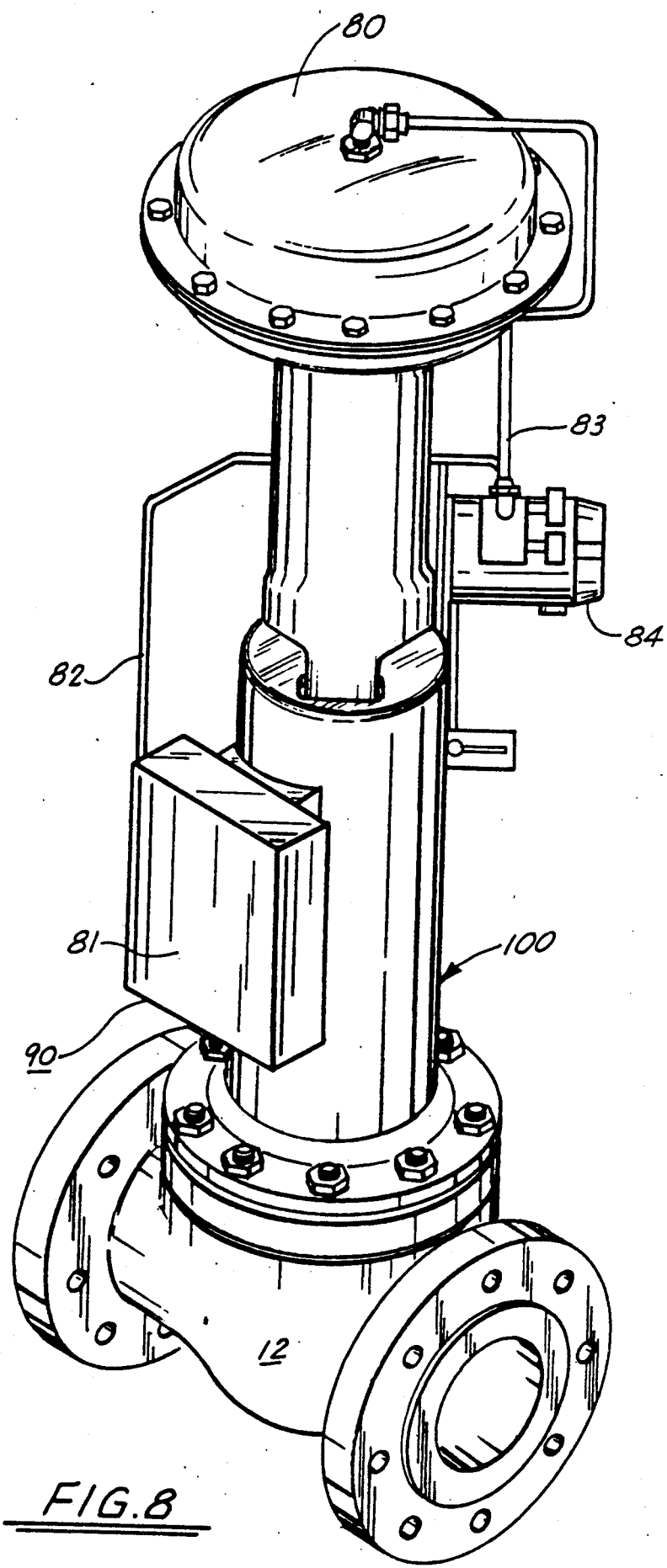
FIG. 8 is a perspective view of another embodiment of the apparatus of the present invention showing the connection of the valve stem position transmitter and the actuator stem positioner.

In FIGS. 6–8, there is seen a valve stem position feedback transmitter which is designated generally by the numeral 90 and which attaches to a safety shroud 100 that defines a mounting over the entire valve bonnet assembly (see FIG. 6). In FIG. 8, a persepctive view of the entire valve assembly illustrating the valve stem position feedback transmitter 90 is shown while FIG. 7 illustrates an alternate embodiment of the valve stem position indicator.

The valve stem position indicator 81 could be a pointer with a scale. The pointer would slide with the magnetic field. In FIG. 8, the position indicator 81 is a feedback transmitter having an output line 82 that communicates with the valve actuator stem position controller 84, coupled via line 83 to diaphragm actuator 80.

In view of the numerous modifications which could be made to the preferred embodiments disclosed herein without departing from the scope or spirit of the present invention, the details herein are to be interpreted as illustrative and not in a limiting sense.

What is claimed as invention is:

1. A sliding stem valve apparatus comprising:
   (a) a valve body having a longitudinally extending flow bore with inlet and outlet end portions;
   (b) a valve seat, positioned in the flow bore and defining an opening that communicates with the flow bore;
   (c) a cylindrical valving member movable between open flow and flow closed positions, for sealing the opening by registering the valving member upon the valve seat in the closed position;
   (d) a sliding valve stem, that extends laterally away from the housing at an angle with respect to the longitudinally extending flow bore, for moving the valving member along a generally linear path between open flow and closed flow position;
   (e) a valve body sealing surface on the valve body that surrounds and is spaced from the stem;
   (f) a removable bonnet, having a lower flanged portion with a bonnet sealing surface connectable to the valve body at the valve body sealing surface for forming a sealed envelope with the body over the entire valve stem;
   (g) a plurality of bolts for pressing the valve body and bonnet sealing surfaces together to produce a fluid tight seal;
   (h) a magnetic annular sleeve member of generally uniform diameter that extends around the valve bonnet to provide a magnetic field that extends internally of the valve bonnet;
   (i) an actuator positioned externally of the bonnet for moving with the valve stem and the magnetic field, the magnetic field being moveable along a line generally parallel to the valve stem; and
   (j) the upper end portion of the stem carrying an enlarged diameter stem member that moves with the magnetic field when the actuator moves between open and closed flow positions.

2. The apparatus of claim 1 further comprising a valve actuator mechanism for moving the magnetic member.

3. The apparatus of claim 2 further comprising a yoke that supports the annular sleeve for movement.

4. The apparatus of claim 3 wherein the actuator means includes an elongated shaft generally aligned with the valve stem.

5. The apparatus of claim 4 wherein the actuator means include a housing attached to the bonnet opposite the valve body.

6. A method of modifying valves having a valve body and a valving member carried by a sliding stem that extends into a removable valve bonnet and through a packing gland in order to prevent fugitive emissions at the interface between the stem and the packing gland, comprising the steps of:
  (a) removing the existing valve bonnet;
  (b) covering the entire valve stem with a closed wall bonnet that seals the area about the stem and contains fluids adjacent thereto;
  (c) adding an external operator to the bonnet and valve assembly that moves the stem with a magnetic field that is formed by using a magnetic member so that the magnetic field extends between the operator and the stem; and
  (d) wherein in step "a", the existing valve bonnet is unbolted from the valve body, and the closed wall bonnet is bolted to the valve body at the same bolted connectors that held the existing bonnet.

7. The method of claim 6 wherein in step "c", the external operator is a magnetic member.

8. The method of claim 6 wherein in step "c", the stem carries a magnetic member at its upper end portion.

9. The method of claim 6 wherein in step "c", the external operator is a magnetic member and one end portion of the stem carries a magnetic member so that the magnetic field is comprised of magnets positioned both internally and externally of the bonnet.

10. The method of claim 6 wherein in step "c", the external operator is moved using fluid power.

11. The method of claim 6 wherein the magnetic field is formed by a permenent magnet.

12. The method of claim 6 wherein the magnetic field is formed by an electromagnet.

13. The method of claim 9 wherein at least one of the magnets is a permenent magnet.

14. The method of claim 9 wherein at least one of the magnets is an electromagnet.

* * * * *